US010710261B2

(12) United States Patent
Hu et al.

(10) Patent No.: US 10,710,261 B2
(45) Date of Patent: Jul. 14, 2020

(54) LOCATING PIN, WORKING PLATFORM AND LOCATING METHOD

(71) Applicants:BOE TECHNOLOGY GROUP CO., LTD., Beijing (CN); HEFEI BOE OPTOELECTRONICS TECHNOLOGY CO., LTD., Anhui (CN)

(72) Inventors: Bing Hu, Beijing (CN); Jun Liu, Beijing (CN); Jinlong Wu, Beijing (CN); Qingguo Peng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 229 days.

(21) Appl. No.: 15/797,299

(22) Filed: Oct. 30, 2017

(65) Prior Publication Data

US 2018/0207828 A1    Jul. 26, 2018

(30) Foreign Application Priority Data

Jan. 24, 2017    (CN) .......................... 2017 1 0059303

(51) Int. Cl.
*B23P 19/00*    (2006.01)
*B26D 7/01*    (2006.01)
(Continued)

(52) U.S. Cl.
CPC ................. *B26D 7/01* (2013.01); *B26D 7/20* (2013.01); *F16B 19/02* (2013.01)

(58) Field of Classification Search
CPC ....... B23P 11/00; B23P 11/005; B23P 11/027; B26D 7/01
See application file for complete search history.

(56) References Cited

U.S. PATENT DOCUMENTS 4,765,048 A * 8/1988 Hokanson ............. B25B 27/023
29/221.5
5,188,155 A * 2/1993 Kremer ................. F17C 13/002
137/454.2
(Continued)

FOREIGN PATENT DOCUMENTS

CN    201687822 U    12/2010
CN    102126612 A    7/2011
(Continued)

OTHER PUBLICATIONS

1st Chinese Office Action, English Translation.
(Continued)

*Primary Examiner* — Lee D Wilson
(74) *Attorney, Agent, or Firm* — Brooks Kushman P.C.

(57) ABSTRACT

The present disclosure provides a locating pin, a working platform and a locating method. The locating pin includes a housing, a movable mechanism, a securing mechanism and a guide rod, wherein the housing has a first cavity with an opening that has an axis therethrough, the movable mechanism is at least partially arranged in the first cavity and configured to be movable along the axis, the securing mechanism is secured with respect to the housing and configured to limit movement of the movable mechanism along the axis, the guide rod includes a guide rod body and configured to extend out of the first cavity through the opening with the movement of the movable mechanism, the guide rod body having a first end and a second end opposite to each other, wherein the first end is secured to the movable mechanism, and the second end includes a locating portion.

20 Claims, 5 Drawing Sheets

(51) Int. Cl.
*B26D 7/20* (2006.01)
*F16B 19/02* (2006.01)

(56) References Cited

U.S. PATENT DOCUMENTS

| | | | | |
|---|---|---|---|---|
| 5,613,297 A | * | 3/1997 | Dvorak | H01R 43/015 |
| | | | | 29/252 |
| 2008/0235930 A1 | * | 10/2008 | English | B25B 27/062 |
| | | | | 29/426.5 |
| 2011/0162186 A1 | * | 7/2011 | Chapin | B25B 27/02 |
| | | | | 29/426.5 |
| 2014/0366351 A1 | * | 12/2014 | Whitaker | B25B 27/023 |
| | | | | 29/264 |

FOREIGN PATENT DOCUMENTS

| | | |
|---|---|---|
| CN | 203214524 U | 9/2013 |
| CN | 205312467 U | 6/2016 |
| CN | 106064880 A | 11/2016 |
| JP | 3608980 B2 | 1/2005 |

OTHER PUBLICATIONS

CN102126612A, English Abstract and Machine Translation.
CN106064880A, English Abstract and Machine Translation.
CN201687822U, English Abstract and Machine Translation.
CN203214524U, English Abstract and Machine Translation.
CN205312467U, English Abstract and Machine Translation.
JP3608980B2, English Abstract and Machine Translation.
First Office Action for Chinese Application No. 201710059303.4, dated Feb. 27, 2018, 7 Pages.

\* cited by examiner

LOCATING PIN, WORKING PLATFORM AND LOCATING METHOD

CROSS-REFERENCE TO RELATED APPLICATION

This application claims priority to Chinese Patent Application No. 201710059303.4 filed on Jan. 24, 2017, which is incorporated by reference herein in its entirety.

TECHNICAL FIELD

The embodiments of the disclosure relates to a locating pin, a working platform and a locating method.

BACKGROUND

With continuous development of a mobile electronic devices and a wearable smart device, such an electronic product has now become major consumer goods. Due to a relatively small size of a display panel on the portable electronic device and the wearable smart device, it is usually necessary to semi-automatically cut a large-sized mother board into a plurality of small-sized panels. However, in the above-mentioned cutting process, both loading and unloading operation need an operator. In the case that the operator performs the operation, a locating pin is necessarily arranged on a working platform, so as to assist the operator to put a to-be-cut substrate in an accurate location.

SUMMARY

At least one embodiment of the present disclosure provides a locating pin, a working platform and a locating method.

At least one embodiment of the present disclosure provides a locating pin, including: a housing, with a first cavity having an opening, wherein the opening has an axis therethrough; a movable mechanism, at least partially arranged in the first cavity and configured to be movable along the axis; a securing mechanism, secured with respect to the housing and configured to limit movement of the movable mechanism along the axis; and a guide rod, including a guide rod body and configured to extend out of the first cavity through the opening with the movement of the movable mechanism, the guide rod body having a first end and a second end opposite to each other, wherein the first end is secured to the movable mechanism, and the second end includes a locating portion.

Optionally, the locating portion includes a contact plane configured to be in contact with a to-be-located object.

Optionally, a first angle formed between the contact plane and the axis is greater than 0 and less than 90 degrees.

Optionally, a cross-sectional size of the locating portion is less than that of the guide rod body.

Optionally, a portion of the locating portion connected with the guide rod body serves as a limiting portion that is configured to limit a maximum distance of the guide rod extending out of the first cavity.

Optionally, the securing mechanism is arranged at one end of the first cavity and includes a second cavity, the locating portion is configured to pass through the second cavity so as to extend out of the first cavity, an end of the second cavity facing the movable mechanism includes a guiding portion, and an end of the movable mechanism facing the second cavity includes a boss that has an inclined side surface and matches the guiding portion.

Optionally, a cross-sectional size of the guiding portion gradually increases towards the movable mechanism, and a cross-sectional size of the boss decreases gradually towards the securing mechanism. Further, a minimum cross-sectional size of the guiding portion is equal to a minimum cross section cross-sectional size of the boss.

Optionally, the locating pin further includes a driving mechanism configured to drive the movable mechanism to move along the axis.

Optionally, the driving mechanism is arranged in the first cavity and around the movable mechanism, the driving mechanism includes a spool mechanism and an electromagnetic coil wound on the spool mechanism, and the electromagnetic coil is configured to generate a magnetic force to drive the movable mechanism to move along the axis.

Optionally, the securing mechanism is arranged at the opening, and the movable mechanism is arranged within the first cavity and at one side of the first cavity opposite to the securing mechanism.

Optionally, the locating pin further includes a resetting member configured to urge the movable mechanism in a direction away from the securing mechanism.

At least one embodiment of the present disclosure provides a working platform, including: a supporting table, having a supporting surface and configured to bear thereon a to-be-processed object; a locating hole, arranged in the supporting table; and a locating pin, including a housing, a movable mechanism, a securing mechanism and a guide rod; wherein the housing is provided with a first cavity having an opening that has an axis therethrough; the movable mechanism is at least partially arranged in the first cavity and configured to be movable along the axis; the securing mechanism is secured with respect to the housing and configured to limit movement of the movable mechanism along the axis; the guide rod includes a guide rod body that has a first end and a second end opposite to each other, and is configured to extend out of the first cavity through the opening with the movement of the movable mechanism; the first end is secured to the movable mechanism; and the second end includes a locating portion that is capable of passing through the locating hole and extending out of the supporting surface to assist in locating an to-be-processed object supported on the supporting surface, or capable of being retracted underneath the supporting surface along the locating hole.

Optionally, the locating portion includes a contact plane configured to be in contact with the to-be-processed object.

Optionally, a first angle is formed between the contact plane and the axis, a second angle is formed between the axis and a side surface of the to-be-processed object and equal to the first angle, the supporting table further includes a side wall intersecting the supporting surface, the locating hole extends to the side wall from the supporting surface, a third angle is formed between an extension direction of the locating hole and a direction perpendicular to the supporting surface and is equal to the first angle, and the first angle is greater than 0 and less than 90 degrees.

Optionally, a maximum height of the locating portion extending out of the supporting surface is greater than 9 mm.

Optionally, a portion of the locating portion connected with the guide rod body serves as a limiting portion that is configured to limit a maximum distance of the guide rod extending out of the first cavity.

Optionally, a cross-sectional size of the locating portion is less than that of the guide rod body, and a cross-sectional size of the locating hole is greater than and equal to that of the locating portion and less than that of the guide rod body.

Optionally, the working platform further includes an adsorbing hole arranged in the supporting surface and configured to adsorb the to-be-processed object.

At least one embodiment of the present disclosure provides a locating method, applied to any one of the above-mentioned working platforms, the method including following steps: enabling, the locating portion to pass through the locating hole and extend out of the supporting surface; and locating the to-be-processed object placed on the supporting surface by the locating portion.

Optionally, the method further includes: enabling the locating portion to be retracted underneath the supporting surface along the locating hole; and cutting the to-be-processed object.

Optionally, the working platform further includes an adsorbing hole, arranged in the supporting surface and configured to adsorb the to-be-processed object, the method further including: securing the to-be-processed object on the supporting surface by the adsorbing hole.

BRIEF DESCRIPTION OF THE DRAWINGS

In order to more clearly explain the technical solutions of the embodiments of the present disclosure, the drawings in the embodiments are briefly introduced as follows. Apparently, the following drawings merely illustrate some embodiments of the present disclosure, not to limit the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure. Based on the embodiments of the present disclosure, any other embodiments obtained by a person skilled in the art without any creative effort shall fall within the protection scope of the present disclosure.

Unless otherwise defined, any technical or scientific terms used herein shall have the common meaning understood by a person of ordinary skills. Such words as "first", "second" or the like used in the present disclosure are merely used to differentiate different components rather than to represent any order, number or importance. The word "comprise" or "include" or the like means that an element or a component which appears before a word contains elements or components listed after the word and equivalents thereof, not excluding other elements or components. Such words as "connect" or "connected to" or the like may include electrical connection, direct or indirect, rather than being limited to physical or mechanical connection.

Figure 1:
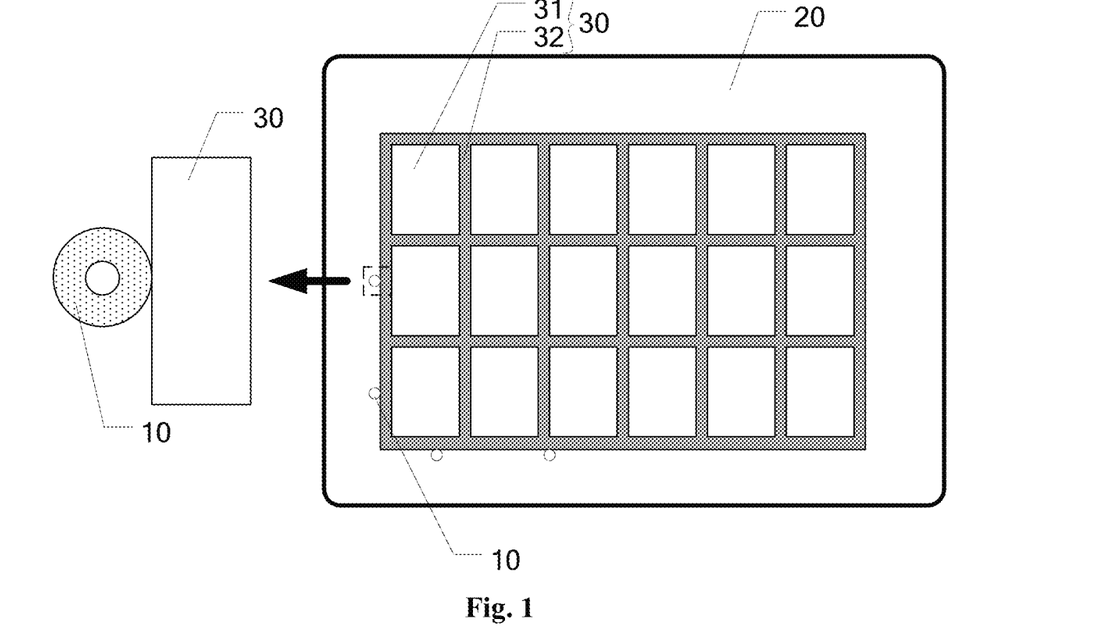
FIG. 1 is a schematic plan view of a cutting platform.

Currently, in the case that an operator cuts a glass substrate, a display panel, or the like, it is necessary to arrange a locating pin on the working platform so as to assist the operator to rapidly put and secure the to-be-cut object in an accurate location. As shown in FIG. 1, the working platform includes a supporting table 20 and a locating pin 10 arranged on the supporting table 20; the to-be-cut object 30 may include a plurality of subareas 31 arranged in an array and cutting areas 32 among the subareas 31. For example, the to-be-cut object 30 may be a display panel of the liquid crystal display, including a plurality of sub liquid crystal display panels 31 arranged in an array and cutting areas 32 (for example, sealant areas) among the sub liquid crystal display panels 31. The operator may rapidly put the to-be-cut object 30 in the accurate location by the locating pin 10, thereby providing an accurate location for a subsequent cutting process, and thus preventing the cutting tool from cutting a subarea 31 and increasing a product yield.

Figure 2A:
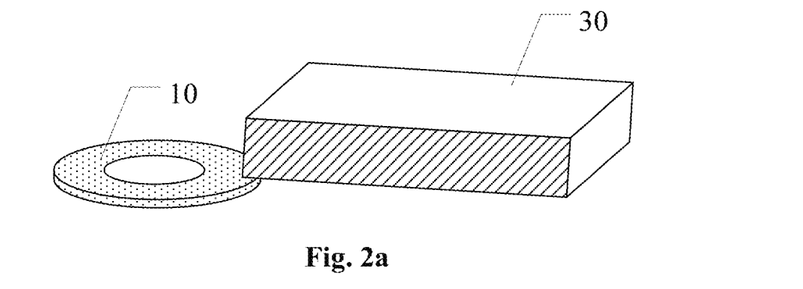
FIG. 2a is a diagram showing a positional relation between a locating pin and a to-be-located object in a cutting platform.
Figure 2B:
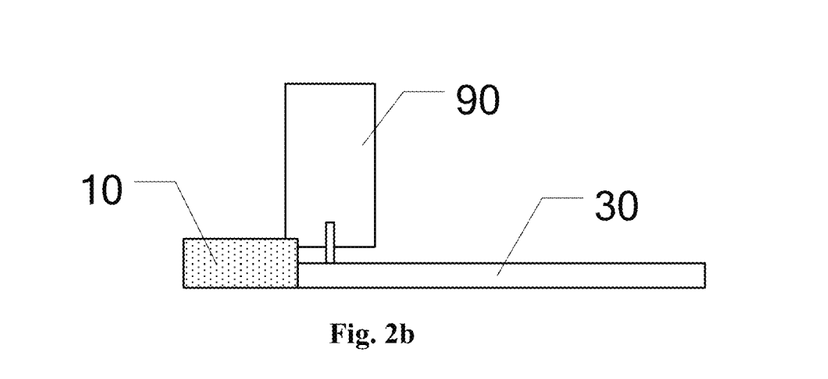
FIG. 2b is a diagram showing a positional relation among a locating pin, a cutting tool and an object to be located in a cutting platform.
Figure 2C:
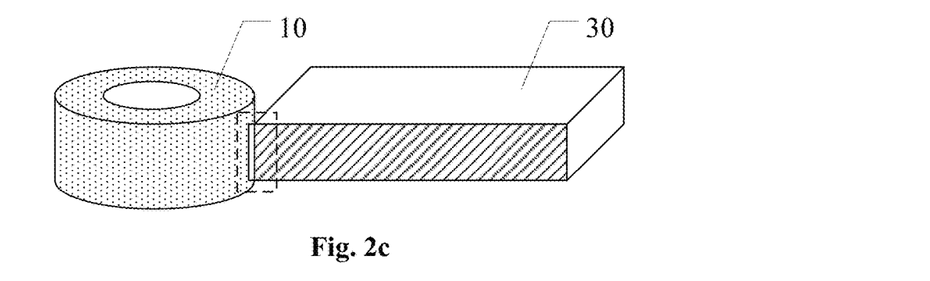
FIG. 2c is a diagram showing another positional relation between a locating pin and an object to be located in a cutting platform.
Figure 2D:
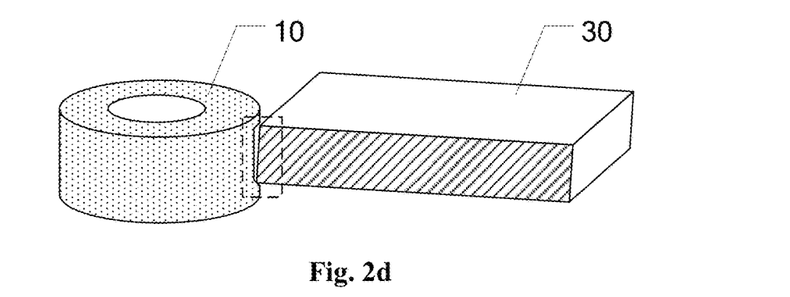
FIG. 2d is a diagram showing another positional relation between a locating pin and an object to be located in a cutting platform.

However, in the case that the to-be-cut object 30 is relatively thin (for example, the glass substrate is thinned to have a thickness of about 400 μm), and that the locating pin has a relatively low height, as shown in FIG. 2a, the operator easily presses the to-be-cut object 30 on the locating pin 10. At this point, the locating pin 10 does not function to locate, causes the to-be-cut object 30 to partially suspend in the air or incline, thereby reducing locating accuracy of the locating pin 10, and even breaking the to-be-cut object 30 in the subsequent cutting process. However, in the case that the locating pin 10 has a relatively high height, as shown in FIG. 2b, the cutting tool 90 (for example, a bracket of a cutter wheel) tends to interfere with the locating pin 10, which increases the risk of collision, and damages both the cutting tool 90 and the to-be-cut object 30. On the other hand, as shown in FIG. 2c, the locating pin usually has a cylindrical profile, and is usually made of a polyether-ether-ketone (PEEK) material with a relatively low surface hardness. In the case that the to-be-cut object 30 has a relatively high hardness, for example, the to-be-cut object 30 may include glass with a surface hardness much greater than the polyether-ether-ketone (PEEK), when the to-be-cut object 30 applies a force to the locating pin 10 laterally to implement location, the locating pin 10 is in point contact or in line contact with the to-be-cut object 30. An intensity of pressure is relatively large, and thus the to-be-cut object 30 tends to abrade the locating pin 10. As shown in FIG. 2c, after the locating pin 10 is abraded, the locating pin 10 becomes smaller in terms of size or is deformed, thereby reducing the locating accuracy of the locating pin 10; or as shown in FIG. 2d, after the locating pin 10 is abraded, the to-be-cut object 30 is stuck at the position where the locating pin 10 is abraded, causing the to-be-cut object 30 to suspend in the air partially, thereby reducing the locating accuracy of the locating pin 10, and even breaking the to-be-cut object 30 in the subsequent cutting process.

At least one embodiment of the present disclosure provides a locating pin, a working platform and a locating method applied to the working platform.

The locating pin according to an embodiment of the present disclosure includes a housing, a movable mechanism, a securing mechanism and a guide rod. The housing has a first cavity, and the first cavity having an opening that has an axis therethrough. The movable mechanism is at least partially arranged in the first cavity and configured to be movable along the axis. The securing mechanism is secured with respect to the housing and configured to limit movement of the movable mechanism along the axis. The guide rod includes a guide rod body that has a first end and a second end opposite to each other, and is configured to extend out of the first cavity through the opening with the movement of the movable mechanism. The first end is secured to the movable mechanism; and the second end includes a locating portion. The locating portion of the locating pin is movable along the axis with the movable mechanism, to implement the extending or retracting motion along a direction of the axis. Therefore, after being mounted onto the corresponding working platform, the locating portion is capable of extending out of the working platform in the case of locating the to-be-located object, and retracting into the working platform in the case of processing (for example, cutting, translating, or the like) the to-be-located object.

The locating pin may have at least one of the following technical effects: preventing the locating pin from failing to locate and the to-be-located object from suspending partially since the personnel tends to press the locating pin by the to-be-located object due to relatively low height of the locating pin; avoiding reduction of the locating accuracy of the locating pin and even the problem such as breaking the to-be-located object in the subsequent process (for example, cutting); avoiding collision caused by the interference of a processing tool (for example, the cutting tool) with the locating pin due to a relatively high height of the locating pin; and avoiding damage to the processing tool and the to-be-located object. On the other hand, the locating pin may also increase the processing efficiency and yield of the working platform using the locating pin.

The locating pin, the working platform and the locating method applied to the working platform according to the embodiment of the present disclosure are below explained in conjunction with the drawings.

First Embodiment

Figure 3:
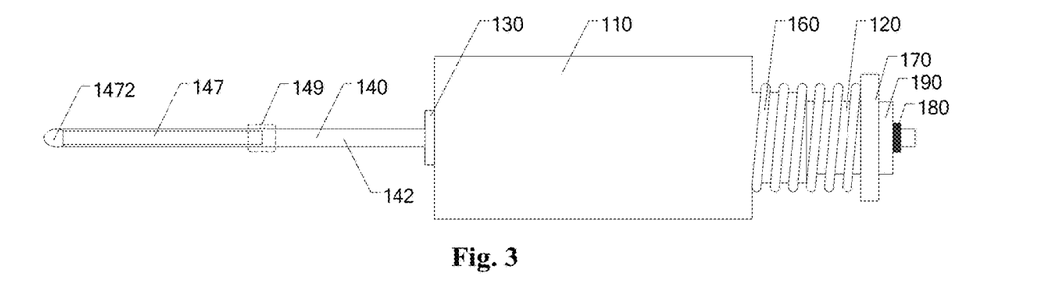
FIG. 3 is a structural schematic diagram of a locating pin according to at least one embodiment of the present disclosure.
Figure 4:
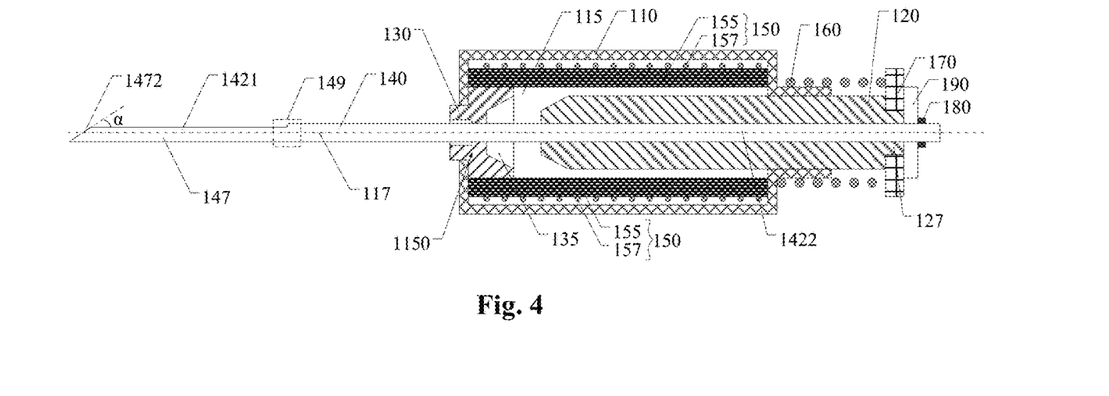
FIG. 4 is a sectional schematic diagram of a locating pin according to at least one embodiment of the present disclosure.

The present embodiment provides a locating pin. FIG. 3 is a structural schematic diagram of the locating pin. As shown in FIG. 3, the locating pin includes a housing 110, a movable mechanism 120, a securing mechanism 130 and a guide rod 140. FIG. 4 is a sectional schematic diagram of the locating pin. The housing 110 has a first cavity 115 with an opening 1150 that has an axis 117 therethrough. For example, the housing 110 may have a thin shell, and has therein a first cavity 115; the movable mechanism 120 is at least partially arranged in the first cavity 115 and is movable along the axis 117; the securing mechanism 130 is secured with respect to the housing 110, and may limit the movement of the movable mechanism 120 along the axis 117; the guide rod 140 includes a guide rod body 142 and is movable along the axis 117 with the movable mechanism 120 to be out of the first cavity 115, that is, the guide rod 140 is movable along the movement of the movable mechanism 120 along the axis 117 and extends out of the first cavity 115 through the opening 1150. Certainly, during the movement of the guide rod 140 along the axis 117, the guide rod 140 is capable of fully retracting into the first cavity 115 or at least partially extending out of the first cavity 115 all the time, which is not limited in the embodiment of the present disclosure. The guide rod body 142 has a first end 1421 and a second end 1422 opposite to each other, the first end 1421 is secured on the movable mechanism, and the second end 1422 includes a locating portion 147.

The locating pin according to the embodiment is capable of assisting the location of the to-be-located object. The locating portion 147 of the locating pin is movable along the axis 117 with the movable mechanism 120, so as to extend and retract along a direction of the axis 117. Therefore, the locating portion is capable of extending out of the working platform in the case of locating the to-be-located object, and retracting into the working platform in the case of processing (for example, cutting, translating) the to-be-located object. The locating pin according to the present embodiment may have at least one of the following technical effects: preventing the locating pin from failing to locate and the to-be-located object from suspending partially since the personnel tends to press the locating pin by the to-be-located object due to relatively low height of the locating pin; avoiding the reduction of the locating accuracy of the locating pin and even the problem such as breaking the to-be-located object in the subsequent process (for example, cutting); avoiding collision caused by the interference of a processing tool (for example, the cutting tool) with the locating pin due to a relatively high height of the locating pin; and avoiding damage to the processing tool and the to-be-located object. As such, the locating pin may increase the locating accuracy as well as the processing efficiency and the yield of the working platform using the locating pin. In addition, the locating pin does not tend to cause problems such as damage or scratch in use, thereby reducing a replacement frequency of the locating pin and having a long service life, and thus lowering the costs.

For example, in the locating pin according to an example of the present embodiment, as shown in FIGS. 3 and 4, the locating portion 147 includes a contact plane 1472 which is contactable with the to-be-located object (for example, the glass substrate, the display panel, or the like). As such, when the locating pin is used to assist the location of the to-be-located object, the contact plane of the locating portion is in surface contact with the to-be-located object, thereby reducing the intensity of pressure between the to-be-located object and the locating pin, and preventing the to-be-located object from damaging or scratching the locating portion or preventing the locating portion from damaging or scratching the to-be-located object. For example, in the case that the material of the locating portion has a surface hardness less than the to-be-located object, when the to-be-located object applies a force laterally to the contact plane of the locating portion to implement location, the contact plane is in surface contact with the to-be-located object, and the intensity of pressure of the to-be-located object to the locating portion is relatively small, so the locating portion will not be damaged or scratched. It should be noted that, in the case that the material of the locating portion has a surface hardness greater than the to-be-located object, the locating pin according to the present embodiment may prevent the locating portion from scratching the to-be-located object, which is not limited in the embodiment of the present disclosure.

For example, in the locating pin according to one example of the present embodiment, as shown in FIGS. 3 and 4, a first angle α formed between the contact plane 1472 and the axis 117 is larger than 0 and less than 90 degrees. As such, in the case that an angle between the axis and the to-be-located object is equal to the first angle, the contact plane is parallel and in surface contact with a side surface of the to-be-located object. Meanwhile, since the locating portion moves along the axis, the movement of the locating portion along the axis with the guide rod may be decomposed into a movement in a direction perpendicular to the side surface of the to-be-located object and a movement in a direction parallel with the side surface of the to-be-located object, thereby avoiding a friction caused when the locating portion is close to or away from the to-be-located object. For example, after the locating pin according to the present embodiment is located, the contact plane of the locating portion does not rub against the side surface of the to-be-located object upon retracting along the axis, which may avoid the friction generated when the locating portion retracts along a direction parallel with the side surface of the to-be-located object, thereby preventing the locating portion from being stuck and abrading the to-be-located object. On the other hand, the locating pin according to the present embodiment may reduce or even eliminate mechanical abrasion, thereby further reducing the replacement frequency of the locating pin, and even requiring no replacement requirement, and thus further lowering the cost.

For example, in the locating pin according to one example of the present embodiment, as shown in FIGS. 3 and 4, a cross-sectional size of the locating portion 147 may be less than that of the guide rod body 142, and the portion of the locating portion 147 connected with the guide rod body 142, that is, the retracting portion of the guide rod 140 in FIG. 4, serves as the limiting portion 149. As such, after the locating pin according to the present embodiment is mounted on the working platform, a maximum extending distance of the guide rod or the locating portion may be limited by the limiting portion, which increases the locating accuracy of the locating portion and ensures that the guide rod or the locating portion does not extend out too much to damage the to-be-located object. Even when failure occurs in the locating pin, the limiting portion may ensure that the guide rod or the locating portion does not extend out too much to damage the to-be-located object, thereby reducing the possibility of damage to the to-be-located object.

For example, the locating hole may be arranged in the working platform, and a cross-sectional size of the locating hole is greater than or equal to that of the locating portion, but less than that of the guide rod body. Hence, only the locating portion is allowed to pass through the locating hole, and the guide rod body cannot pass through the locating hole. It should be noted that a cross-sectional size of the locating portion is less than that of the guide rod body may be the case that the locating portion and the guide rod body have a same shape, the diameter, length or width of the cross section of the locating portion is less than that of the guide rod body, or may be the case that the cross section of the locating portion is formed by cutting a part of the cross section of the guide rod body, which is not limited in the embodiment of the present disclosure.

For example, as shown in FIGS. 3 and 4, the cross section of the locating portion 147 is formed by cutting a part of the cross section of the guide rod body 142. As such, the locating portion is easy to be processed due to the shape, which lowers the manufacture cost of the locating pin.

Figure 5:
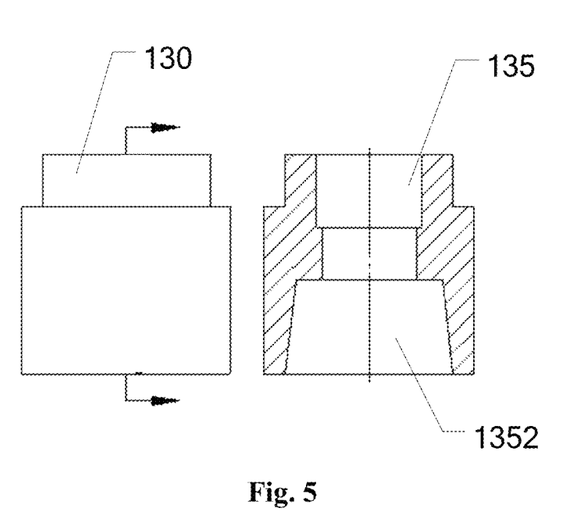
FIG. 5 is a structural schematic diagram of a securing mechanism in a locating pin according to at least one embodiment of the present disclosure.

For example, FIG. 5 is a structural schematic diagram of a securing mechanism. As shown in FIGS. 4 and 5, in the locating pin according to an example of the present embodiment, the securing mechanism 130 is arranged at one end of the first cavity 115, and includes a second cavity 135, through which the guide rod 140 passes to be out of the first cavity 115. A minimum cross-sectional size of the second cavity 135 is less than that of the movable mechanism 120. As such, when the movable mechanism 120 moves along the axis 117, the securing mechanism 130 may limit the movement of the movable mechanism 120 along the axis 117. It should be noted that the movable mechanism may partially pass through the second cavity or cannot pass through the second cavity, which is not limited in the embodiment of the present disclosure.

Figure 6:
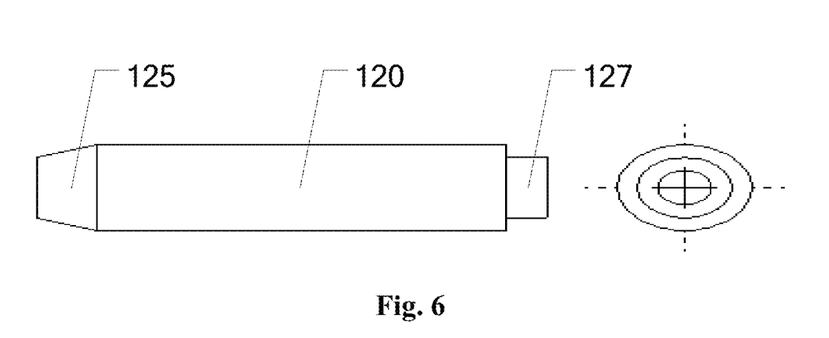
FIG. 6 is a structural schematic diagram of a movable mechanism in a locating pin according to at least one embodiment of the present disclosure.

For example, due to reasons such as assembly accuracy, when the movable mechanism moves along the axis, an offset may occur in the direction perpendicular to the axis. Hence, in the locating pin according to an example of the present embodiment, as shown in FIGS. 4 and 5, the end of the second cavity 135 facing the movable mechanism 120 includes a guiding portion 1352 with a cross-sectional size that gradually increases. FIG. 6 is a structural schematic diagram of a movable mechanism. As shown in FIGS. 4 and 6, the end of the movable mechanism 120 facing the second cavity 135 includes a boss 125 that has an inclined side surface and matches the guiding portion 1352, and the minimum cross-sectional size of the guiding portion 1352 is the same as that of the boss 125. As such, while the movable mechanism 120 moves close to the securing mechanism 130 along the axis 117, the guiding portion 1352 is capable of correcting the offset of the movable mechanism 120 in a direction perpendicular to the axis 117 by gradually fitting the guiding portion 1352 and the inclined lug boss 125, thereby on the one hand, preventing the movable mechanism from being stuck, and on the other hand, increasing the accuracy of the movable mechanism in a direction perpendicular to the axis so as to increase the locating accuracy of the locating pin.

For example, in the locating pin according to an example of the present embodiment, as shown in FIG. 4, this locating pin may further include a driving mechanism 150 which drives the movable mechanism 120 to move along the axis 117. A response speed of the locating pin may be increased by the driving mechanism, thereby increasing the locating efficiency.

Figure 7:
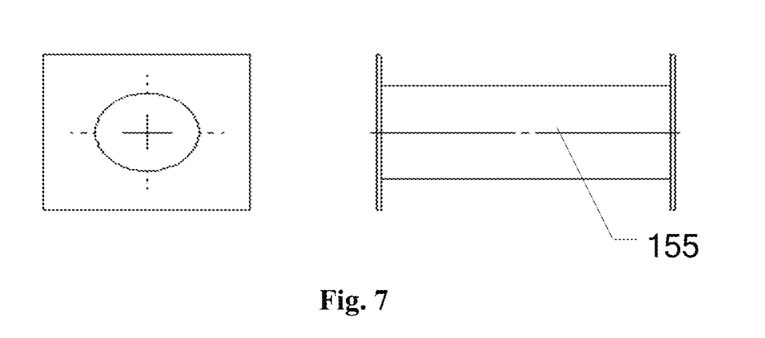
FIG. 7 is a structural schematic diagram of a spool mechanism in a locating pin according to at least one embodiment of the present disclosure.

For example, in the locating pin according to an example of the present embodiment, as shown in FIG. 4, the driving mechanism 150 may be arranged in the first cavity 115 around the movable mechanism 120; the driving mechanism 150 may include a spool mechanism 155 and an electromagnetic coil 157 wound on the spool mechanism 155. FIG. 7 shows a spool mechanism. As shown in FIG. 7, the spool mechanism 155 may be a penetrating cylinder, the electromagnetic coil 157 may be made of metals such as copper, aluminum, or the like; and the electromagnetic coil 157 may be energized to generate a magnetic force, so as to drive the movable mechanism 120 to move along the axis 117. As such, the locating pin according to the present embodiment may be energized to such that the locating portion extends or retracts in the direction of the axis, thereby realizing automation, increasing the response speed of the locating pin and improving the locating efficiency.

For example, in the case that the locating pin according to the present embodiment is suitable for the working platform for cutting, when the to-be-cut object is located, an energizing signal is issued by a controller (for example, a programmable logic controller (PLC), a single chip, or the like), the electromagnetic coil generates a magnetic force such that the movable mechanism moves to the securing mechanism along the axis, and the locating portion is movable with the guide rod and extends out of the working platform. At this point, the to-be-cut object may be located by the locating portion. In the case of cutting the to-be-cut object, a de-energization signal is issued by the controller (for example, the PLC, the single chip, or the like), the magnetic force generated by the electromagnetic coil disappears, and the locating portion is movable with the guide rod and is retractable underneath the working platform, thereby realizing the automation. Moreover, the adoption of the above-mentioned driving mechanism only consumes power in the location, while during the whole cutting process by using the working platform, it takes less time in the locating procedure, thereby lowering the operating cost.

It should be noted that, as the driving mechanism, other driving device may be used, for example, a cylinder driving device or a motor driving device, which is not limited in the embodiment of the present disclosure. In addition, the driving mechanism is configurable to be integrated with the securing mechanism. For example, the securing mechanism is integrated with the spool mechanism, and the electromagnetic coil is wound on the spool mechanism and the securing mechanism.

For example, in the locating pin according to an example of the present disclosure, as shown in FIG. 4, the securing mechanism 130 is arranged at the opening 1150, and the movable mechanism 120 is arranged in the first cavity 115 and at one side of the first cavity 115 opposite to the securing mechanism 130. The locating pin further includes a resetting member 160 which may apply a force to the movable mechanism 120 such that the movable mechanism 120 moves away from the securing mechanism 130. As such, after the electromagnetic coil is de-energized, the magnetic force generated by the electromagnetic coil disappears, and the resetting member may assist the movable mechanism 120 to rapidly move away from the securing mechanism 130.

For example, as shown in FIGS. 3 and 4, the resetting member 130 may be a spring, for example, a spiral spring. One end of the movable mechanism 120 away from the securing mechanism 130 may be provided with a fixed portion 127. The locating pin may further include a fixed plate 170 that is sleeved on a gasket 190, and a stirrup 180 and a gasket 190 are arranged at the tail of the second end 1422 of the guide rod body 142 to secure the fixed plate 170 with respect to the movable mechanism 120. At this point, a force may be applied to the movable mechanism 120 to urge the movable mechanism 120 in a direction away from the securing mechanism 130 by arranging a spring 130 between the housing 110 and the fixed plate 170. Certainly, as the resetting member, any other revertible device may be used, which is not limited in the embodiment of the present disclosure.

Second Embodiment

Figure 8A:
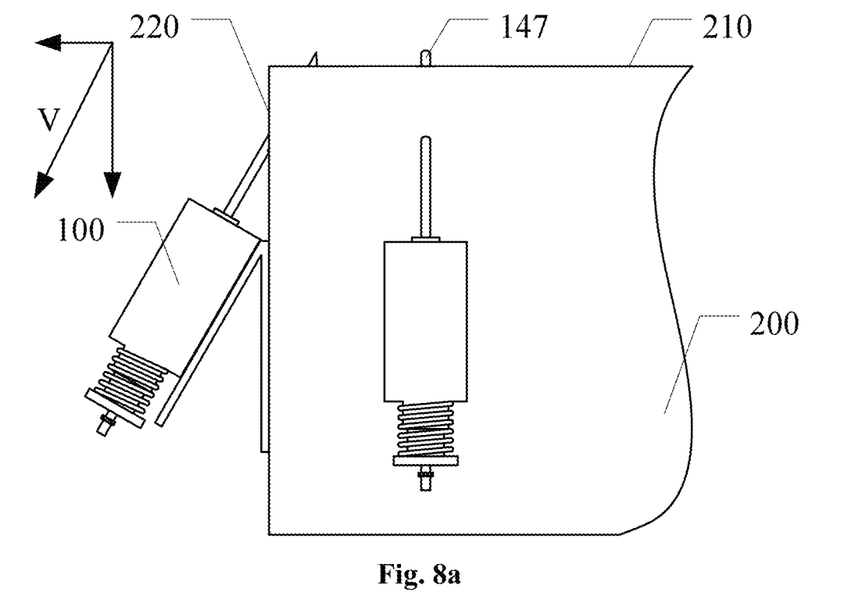
FIG. 8a is a partial structural schematic diagram of a working platform according to at least one embodiment of the present disclosure.
Figure 8B:
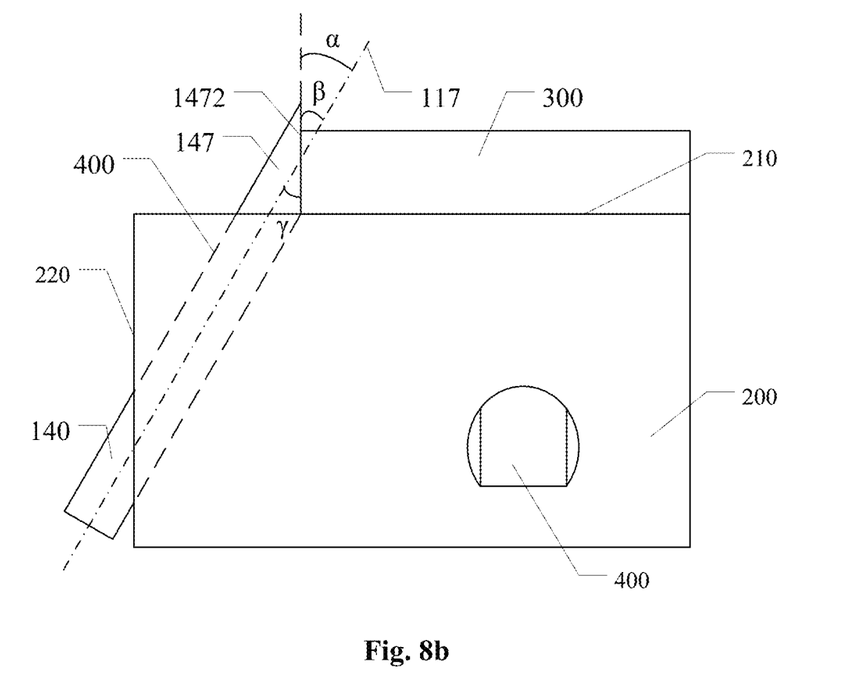
FIG. 8b is a partial structural schematic diagram of another working platform according to at least one embodiment of the present disclosure.

The present embodiment provides a working platform. FIG. 8a shows a schematic side diagram of a working platform, and FIG. 8b is a schematic diagram of a locating hole. As shown in FIGS. 8a and 8b, the working platform includes a supporting table 200 with a supporting surface 210, the supporting surface 210 bearing the to-be-processed object (for example, the to-be-cut object, e.g., the glass substrate, the display panel, or the like); the supporting table 200 is provided thereon with a penetrating locating hole 400, and the working platform may further include a locating pin 100, and any above-mentioned locating pin in the first embodiment may be used as the locating pin 100. As shown in FIGS. 8a and 8b, the locating portion 147 of the locating pin 100 is capable of passing through the locating hole 400 and extend out of the supporting surface 210, and is capable of being retracted underneath the supporting surface 210 along the locating hole 400, and the locating pin 100 is configured to assist the location of the to-be-processed object.

For example, the to-be-processed object may include a to-be-cut display panel, a to-be-cut glass substrate, or the like. For example, the display panel may be a liquid crystal display panel, an organic light emitting diode (OLED) display panel, or the like.

The working platform according to the present embodiment is capable of assisting the location of the to-be-processed object by the locating pin. In this working platform, the locating portion of the locating pin is movable along the axis with the movable mechanism, passes through the locating hole and extends out of the supporting surface, and retracts along the locating hole to be underneath the supporting surface, thereby extending out of the supporting surface in the case of locating the to-be-processed object, and retracting underneath the supporting surface in the case of processing (for example, cutting) the to-be-processed object. As such, the working platform may have at least one of the following technical effects: preventing the locating pin from failing to locate and the to-be-processed object from suspending partially since the personnel tends to press the locating pin arranged on the supporting surface by the to-be-processed object due to relatively low height of the locating pin; avoiding the reduction of the locating accuracy of the locating pin and even the problem such as breaking the to-be-processed object in the subsequent process (for example, cutting); avoiding collision caused by the interference of a processing tool (for example, the cutting tool) with the locating pin arranged on the supporting surface due to a relatively high height of the locating pin; and avoiding damage to the processing tool and the to-be-processed object, thereby increasing the processing efficiency and yield of the working platform while increasing the locating accuracy of the working platform. In addition, the locating pin does not tend to cause problems such as damage or scratch, thereby reducing a replacement frequency of the locating pin, prolonging the service life and lowering the costs. In addition, with any one of the above-mentioned locating pins in the first embodiment, the working platform according to the present embodiment has the corresponding advantageous technical effects to the locating pin in the first embodiment, referring to the related description in the first embodiment for details, which is not limited in the embodiment of the present disclosure.

For example, in the case that the locating portion of the locating pin in the working platform according to the present embodiment includes the contact plane in contact with the to-be-processed object, while the locating pin is used to assist the location of the to-be-processed object, the contact plane of the locating portion is in surface contact with the to-be-located object, thereby reducing the intensity of pressure between the to-be-located object and the locating pin, preventing the to-be-located object from damaging or scratching the locating portion, or the locating portion from damaging or scratching the to-be-located object, referring to the related description in the first embodiment for details, which is not repeated in the present embodiment.

For example, in the case that the first angle α is formed between the contact plane and the axis of the locating pin in the working platform according to the present embodiment, as shown in FIG. 8b, the second angle β is formed between the axis 117 and the side surface of the to-be-processed object 300, the first angle α is equal to the second angle β. In addition, the supporting table 200 further includes a side wall 220 intersecting the supporting surface 210, the locating hole 400 extends to the side wall 220 from the supporting surface 210, the third angle γ is formed between the extending direction of the locating hole 400 and the direction perpendicular to the supporting surface 210, and the third angle γ is equal to the first angle α. As such, after the locating portion 147 is arranged at the locating portion 400 and passes therethrough, it is ensured that the contact plane 1472 is parallel in surface contact with the side surface of the to-be-processed object 300. Meanwhile, since the movement of the locating portion 147 along the axis 117 with the guide rod may be decomposed into a movement in a direction perpendicular to the side surface of the to-be-processed object 300 and a movement in a direction parallel with the side surface of the to-be-processed object 300, thereby avoiding a friction caused when the locating portion 147 is close to or away from the to-be-processed object 300. For example, after the locating pin of the working platform according to the present embodiment is located, the contact plane of the locating portion does not rub against the side surface of the to-be-located object upon retracting along the axis, which may avoid the friction generated when the locating portion retracts along a direction parallel with the side surface of the to-be-processed object, thereby preventing the locating portion from being stuck and abrading the to-be-processed object. In addition, the locating pin according to the present embodiment does not cause abrasion, thereby further reducing the replacement frequency of the locating pin, and even requiring no replacement requirement, and thus further lowering the cost. It should be noted that the above-mentioned first angle α is greater than 0 and less than 90 degrees.

For example, in the case that a cross-sectional size of the locating portion of the locating pin in the working platform according to the present embodiment is less than that of the guide rod body, the portion of the locating portion connected with the guide rod body, i.e., a necking portion of the guide rod, serves as the limiting portion. As such, by setting the cross-sectional size of the locating hole to be greater than or equal to that of of the locating portion and less than that of the guide rod body, only the locating portion is allowed to pass through, but the guide rod body cannot pass through the locating hole, thereby limiting the maximum height of the locating portion extending out of the supporting surface, so as to further increase the locating accuracy of the locating portion and ensure that the guide rod or the locating portion would not extend too much to damage the to-be-processed object, referring to the related description in the first embodiment for details, which is not repeated in the present embodiment.

For example, in the working platform according to one example of the present embodiment, the maximum height of the locating portion extending out of the supporting surface is greater than 9 mm, thereby ensuring that the related personnel would not press the locating portion by the to-be-processed object upon using the working platform to locate the to-be-processed object.

Figure 9:
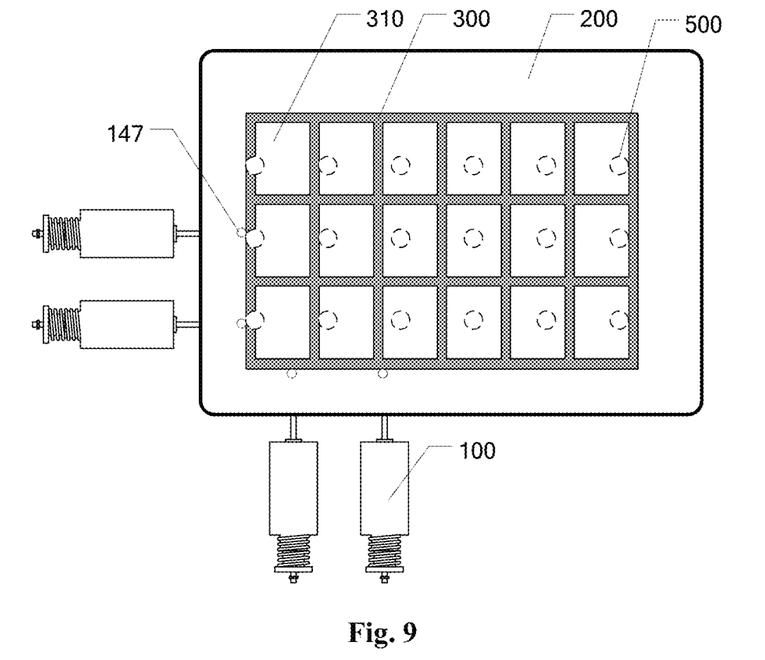
FIG. 9 is a schematic plan diagram of a working platform according to at least one embodiment of the present disclosure.

For example, in the working platform according to one example of the present embodiment, as shown in FIG. 9, the working platform further includes an adsorbing hole 500 arranged on the supporting surface 210 and configured to adsorb the to-be-processed object 300.

Third Embodiment

The present embodiment provides a locating method applied to the working platform, the working platform including any above-mentioned working platform in the second embodiment, the method including steps S301 and S302.

Figure 10:
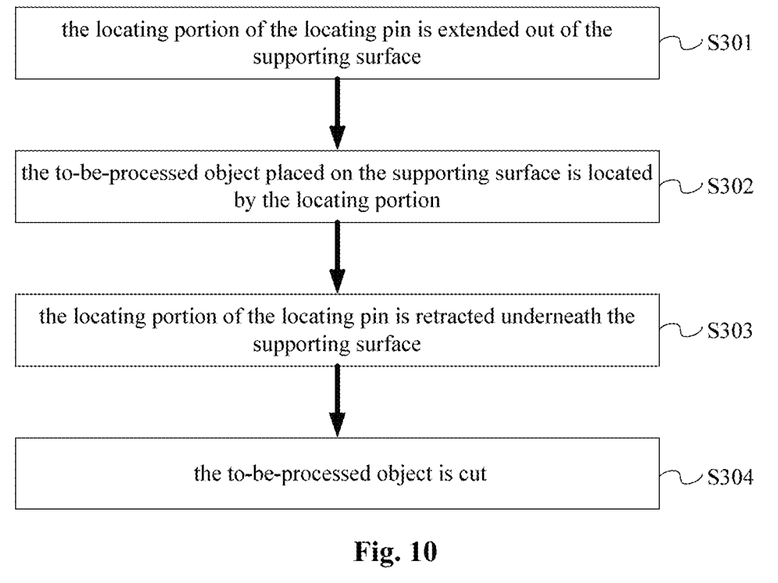
FIG. 10 is a flow chart of a locating method applied to a working platform according to at least one embodiment of the present disclosure.

In step S301, the locating portion of the locating pin is extended out of the supporting surface. Specifically, the locating portion moves relative to the securing mechanism by the movable mechanism of the locating pin moving along the axis.

In step S302, the to-be-processed object placed on the supporting surface is located by the locating portion.

Optionally, the locating method may further include steps S303 and S304.

In step S303, the locating portion of the locating pin is retracted underneath the supporting surface.

In step S304, the to-be-processed object is cut.

With the above-mentioned method, the locating portion may extend out of the supporting surface upon locating the to-be-processed object, and retract underneath the supporting surface upon cutting the to-be-processed object. As such, the adoption of the working platform to cut the object may prevent the locating pin from failing to locate and the to-be-processed object from suspending partially since the personnel tends to press the locating pin arranged on the supporting surface by the to-be-processed object due to relatively low height of the locating pin, avoid the reduction of the locating accuracy of the locating pin and even the problem such as breaking the to-be-processed object in the cutting procedure, avoid collision caused by the interference of a cutting tool with the locating pin arranged on the supporting surface due to a relatively high height of the locating pin, and avoid damage to the processing tool and the to-be-processed object, thereby increasing the processing efficiency and yield of the working platform while increasing the locating accuracy of the working platform. In addition, the locating pin does not tend to cause problems such as damage or scratch, thereby reducing a replacement frequency of the locating pin, prolonging the service life and lowering the costs. In addition, with any above-mentioned locating pin in the first embodiment, the working platform according to the present embodiment has the corresponding advantageous technical effects to the locating pin in the first embodiment, referring to the related description in the first embodiment for details, which is not limited in the embodiment of the present disclosure.

For example, the working platform further includes an adsorbing hole arranged on the supporting surface and configured to adsorb the to-be-processed object, the method further including following steps: after placing the to-be-located object on the supporting surface and locating the locating portion, securing the to-be-processed object on the supporting surface by the adsorbing hole. As such, after the to-be-located object is placed on the supporting surface and the locating portion is located, when the to-be-processed object is cut, displacement of the to-be-processed object does not occur, thereby increasing the cutting accuracy and the yield.

It is to be noted as follows.

First, in the attached drawings of the embodiments of the present disclosure, only the structure related to the embodiments of the present disclosure are described and illustrated, and other structures can be conceived by referring to conventional design.

Second, for clarity purpose, in the attached drawing illustrating the embodiments of the present disclosure, thickness and size of the layers or the micro-structures may be enlarged. It can be understood that when a member such as a layer, a film, an area, a substrate, or the like is referred to as being located "above" or "below" another member, the member can be "directly" located "above" or "below" the other member, or there can be a intervening member.

The features in the same and different embodiments of the present disclosure can be combined with each other unless conflicting with each other.

The above embodiments are only intended to describe the present disclosure, but not to limit the disclosure. Various modifications and variations may be made by those skilled in the art without deviating from the spirit and scope of the present disclosure. All the equivalent technical solutions fall within the scope of the disclosure, and the scope of protection of the disclosure is defined by the claims Therefore, the protection range of the present disclosure shall be subject to the protection range of the claims.

What is claimed is:

1. A locating pin, comprising:
    a housing, comprising a first cavity having an opening, wherein the opening has an axis therethrough;
    a movable mechanism, at least partially arranged in the first cavity and configured to be movable along the axis;
    a securing mechanism, secured with respect to the housing and configured to limit movement of the movable mechanism along the axis; and
    a guide rod, comprising a guide rod body and configured to extend out of the first cavity through the opening with the movement of the movable mechanism, the guide rod body having a first end and a second end opposite to each other, wherein the first end is secured to the movable mechanism, and the second end comprises a locating portion;
    wherein the securing mechanism is arranged at one end of the first cavity and comprises a second cavity, the locating portion is configured to pass through the second cavity so as to extend out of the first cavity, an end of the second cavity facing the movable mechanism comprises a guiding portion, and an end of the movable mechanism facing the second cavity comprises a boss that has an inclined side surface and matches the guiding portion.

2. The locating pin according to claim 1, wherein the locating portion comprises a contact plane configured to be in contact with a to-be-located object.

3. The locating pin according to claim 2, wherein a first angle formed between the contact plane and the axis is greater than 0 and less than 90 degrees.

4. The locating pin according to claim 1, wherein a cross-sectional size of the locating portion is less than that of the guide rod body.

5. The locating pin according to claim 1, wherein a portion of the locating portion connected with the guide rod body serves as a limiting portion that is configured to limit a maximum distance of the guide rod extending out of the first cavity.

6. The locating pin according to claim 1, wherein a cross-sectional size of the guiding portion gradually increases towards the movable mechanism, and a cross-sectional size of the boss decreases gradually towards the securing mechanism.

7. The locating pin according to claim 6, wherein a minimum cross-sectional size of the guiding portion is equal to a minimum cross section cross-sectional size of the boss.

8. The locating pin according to claim 1, further comprising a driving mechanism configured to drive the movable mechanism to move along the axis.

9. The locating pin according to claim 8, wherein the driving mechanism is arranged in the first cavity and around the movable mechanism, the driving mechanism comprises a spool mechanism and an electromagnetic coil wound on the spool mechanism, and the electromagnetic coil is configured to generate a magnetic force to drive the movable mechanism to move along the axis.

10. The locating pin according to claim 1, wherein the securing mechanism is arranged at the opening, and wherein the movable mechanism is arranged within the first cavity and at one side of the first cavity opposite to the securing mechanism.

11. The locating pin according to claim 1, further comprising a resetting member configured to urge the movable mechanism in a direction away from the securing mechanism.

12. A working platform, comprising
    a supporting table, having a supporting surface and configured to bear thereon a to-be-processed object;
    a locating hole, arranged in the supporting table; and
    a locating pin, comprising a housing, a movable mechanism, a securing mechanism and a guide rod;
    wherein the housing is provided with a first cavity having an opening that has an axis therethrough; the movable mechanism is at least partially arranged in the first cavity and configured to be movable along the axis; the securing mechanism is secured with respect to the housing and configured to limit movement of the movable mechanism along the axis; the guide rod comprises a guide rod body that has a first end and a second end opposite to each other, and is configured to extend out of the first cavity through the opening with the movement of the movable mechanism; the first end is secured to the movable mechanism; and the second end comprises a locating portion that is capable of passing through the locating hole and extending out of the supporting surface to assist in locating an to-be-processed object supported on the supporting surface, or capable of being retracted underneath the supporting surface along the locating hole;
    wherein the securing mechanism is arranged at one end of the first cavity and comprises a second cavity, the locating portion is configured to pass through the second cavity so as to extend out of the first cavity, an end of the second cavity facing the movable mechanism comprises a guiding portion, and an end of the movable mechanism facing the second cavity comprises a boss that has an inclined side surface and matches the guiding portion.

13. The working platform according to claim 12, wherein the locating portion comprises a contact plane configured to be in contact with the to-be-processed object.

14. The working platform according to claim 13, wherein a first angle is formed between the contact plane and the axis, a second angle is formed between the axis and a side surface of the to-be-processed object and equal to the first angle, the supporting table further comprises a side wall intersecting the supporting surface, the locating hole extends to the side wall from the supporting surface, a third angle is formed between an extension direction of the locating hole and a direction perpendicular to the supporting surface and is equal to the first angle, and the first angle is greater than 0 and less than 90 degrees.

15. The working platform according to claim 12, wherein a maximum height of the locating portion extending out of the supporting surface is greater than 9 mm.

16. The working platform according to claim 12, wherein a portion of the locating portion connected with the guide rod body serves as a limiting portion that is configured to limit a maximum distance of the guide rod extending out of the first cavity.

17. The working platform according to claim 12, wherein a cross-sectional size of the locating portion is less than that of the guide rod body, and wherein a cross-sectional size of the locating hole is greater than and equal to that of the locating portion and less than that of the guide rod body.

18. The working platform according to claim 12, further comprising an adsorbing hole arranged in the supporting surface and configured to adsorb the to-be-processed object.

19. A locating method, applied to a working platform according to claim 12, the method comprising:
    enabling, the locating portion to pass through the locating hole and extend out of the supporting surface; and
    locating the to-be-processed object placed on the supporting surface by the locating portion.

20. A locating pin, comprising:
    a housing, comprising a first cavity having an opening, wherein the opening has an axis therethrough;
    a movable mechanism, at least partially arranged in the first cavity and configured to be movable along the axis;
    a securing mechanism, secured with respect to the housing and configured to limit movement of the movable mechanism along the axis; and
    a guide rod, comprising a guide rod body and configured to extend out of the first cavity through the opening with the movement of the movable mechanism, the guide rod body having a first end and a second end opposite to each other, wherein the first end is secured to the movable mechanism, and the second end comprises a locating portion;
    a driving mechanism configured to drive the movable mechanism to move along the axis;
    wherein the driving mechanism is arranged in the first cavity and around the movable mechanism, the driving mechanism comprises a spool mechanism and an electromagnetic coil wound on the spool mechanism, and the electromagnetic coil is configured to generate a magnetic force to drive the movable mechanism to move along the axis.

\* \* \* \* \*